US012792903B2

(12) United States Patent
Azizan Ruhi et al.

(10) Patent No.: US 12,792,903 B2
(45) Date of Patent: Nov. 10, 2026

(54) SYSTEMS AND METHODS FOR TRAINING NEURAL NETWORKS

(71) Applicant: California Institute of Technology, Pasadena, CA (US)

(72) Inventors: Navid Azizan Ruhi, Pasadena, CA (US); Ali Sahin Lale, Pasadena, CA (US); Babak Hassibi, San Marino, CA (US)

(73) Assignee: California Institute of Technology, Pasadena, CA (US)

( * ) Notice: Subject to any disclaimer, the term of this patent is extended or adjusted under 35 U.S.C. 154(b) by 790 days.

(21) Appl. No.: 17/090,689

(22) Filed: Nov. 5, 2020

(65) Prior Publication Data

US 2021/0133571 A1 May 6, 2021

Related U.S. Application Data

(60) Provisional application No. 62/931,030, filed on Nov. 5, 2019.

(51) Int. Cl.
*G06N 3/08* (2023.01)
*G06N 3/04* (2023.01)

(52) U.S. Cl.
CPC ................. *G06N 3/08* (2013.01); *G06N 3/04* (2013.01)

(58) Field of Classification Search
CPC ................................... G06N 3/08; G06N 3/04
See application file for complete search history.

(56) References Cited

U.S. PATENT DOCUMENTS

| | | | | |
|---|---|---|---|---|
| 2019/0325313 | A1* | 10/2019 | Shamir | G06N 3/082 |
| 2020/0160185 | A1* | 5/2020 | Praveen | G06N 3/045 |
| 2020/0257998 | A1* | 8/2020 | Troyer | G06F 9/3877 |
| 2021/0065002 | A1* | 3/2021 | Samek | G06N 3/04 |
| 2021/0133583 | A1* | 5/2021 | Chetlur | G10L 15/16 |
| 2021/0295103 | A1* | 9/2021 | Tanniru | G06V 10/7747 |

OTHER PUBLICATIONS

Suriya Gunasekar et al., Characterizing Implicit Bias in Terms of Optimization Geometry', 2018, Proceedings of the 35 the International Conference on Machine Learning, Stockholm, Sweden, PMLR 80, pp. 1-10 (Year: 2018).*

(Continued)

*Primary Examiner* — Markus A. Vasquez
(74) *Attorney, Agent, or Firm* — KPPB LLP

(57) ABSTRACT

Systems and methods for training models in accordance with embodiments of the invention are illustrated. One embodiment includes a method for training an overparameterized model. The method includes steps for initializing an overparameterized model, receiving a set of one or more training samples, determining losses for the set of training samples based on a loss function by computing a loss component of the loss function, and computing a regularizing component of the loss function, wherein computing the regularizing component includes applying a potential function to weights of the overparameterized model, and updating weights of the model based on the determined losses for the set of training samples.

21 Claims, 7 Drawing Sheets

(56) References Cited

OTHER PUBLICATIONS

Thomas Flynn, The Duality Structure Gradient Descent Algorithm: analysis and applications to neural networks, Dec. 25, 2018 , Computational Science Initiative, Brookhaven National Laboratory, Optimization Online, p. 17-38, arXiv No. 1708.00523v5 (Year: 2018).*
Bansal, Yamini, et al. "Minnorm training: an algorithm for training over-parameterized deep neural networks." arXiv preprint arXiv:1806.00730 (2018). (Year: 2018).*
Masood, Sarfaraz, and Pravin Chandra. "Training neural network with zero weight initialization." Proceedings of the CUBE International Information Technology Conference. 2012. (Year: 2012).*
Tan, Chuanqi, et al. "A Survey on Deep Transfer Learning." arXiv e-prints (2018): arXiv-1808. (Year: 2018).*
Achille et al, "On the emergence of invariance and disentangling in deep representations," arXiv:1706.01350v1 [cs.LG], Jun. 5, 2017, 17 pgs.
Allen-Zhu et al., "A Convergence Theory for Deep Learning via Over-Parameterization," Proceedings of the 36th International Conference on Machine Learning, Long Beach, California, PMLR 97, 2019, 11 pgs.
Amodei et al., "Deep Speech 2: End-to-End Speech Recognition in English and Mandarin," Proceedings of the 33rd International Conference on Machine Learning, New York, 2016, pp. 173-182.
Azizan et al., "A Convergence Theory for Deep Learning via Over-Parameterization," in IEEE International Conference on Acoustics, Speech and Signal Processing, (ICASSP), 2019, 5 pgs.
Azizan et al., "Stochastic Gradient/Mirror Descent: Minimax Optimality and Implicit Regularization," in International Conference on Learning Representations (ICLR) 2019, 18 pgs.
Beck et al., "Mirror descent and nonlinear projected subgradient methods for convex optimization," Operations Research Letters, May 2003, vol. 31, Issue 3, pp. 167-175, https://doi.org/10.1016/S0167-6377(02)00231-6.
Biau et al., "High-dimensional p-norms," HAL Id: hal-00879436, https://hal.archives-ouvertes.fr/hal-00879436, Nov. 4, 2013, 19 pgs.
Cesa-Bianchi et al., "Mirror Descent Meets Fixed Share (and feels no regret)," in Advances in Neural Information Processing Systems, 2012, pp. 980-988.
Chaduhari et al., "Stochastic gradient descent performs variational inference, converges to limit cycles for deep networks," in International Conference on Learning Representations, 2018, 20 pgs.
Du et al., "Gradient Descent Finds Global Minima of Deep Neural Networks," arXiv:1811.03804v4, May 29, 2019, 48 pgs.
Gentile, "The Robustness of the p-Norm Algorithms," Machine Learning, 2003, vol. 53, pp. 265-299.
Graves et al., "Speech recognition with deep recurrent neural networks," 2013 IEEE International Conference on Acoustics, Speech and Signal Processing, Mar. 22, 2013, pp. 6645-6649, DOI: 10.1109/ICASSP.2013.6638947.
Grove et al., "General Convergence Results for Linear Discriminant Updates," Machine Learning, 2001, vol. 43, pp. 173-210.
Gunasekar et al., "Characterizing Implicit Bias in Terms of Optimization Geometry," Proceedings of the 35th International Conference on Machine Learning, 2018, pp. 1827-1836.
Gunasekar et al., "Implicit Bias of Gradient Descent on Linear Convolutional Networks," arXiv:1806.00468v2 [cs.LG], Jan. 11, 2019, 28 pgs.
Gunasekar et al., "Implicit Regularization in Matrix Factorization," 31st Conference on Neural Information Processing Systems (NIPS 2017), 6152-6160.
Harvey, "Machine Learning Theory, Lecture 20: Mirror Descent," Lecture Notes, Nov. 21, 2018, 14 pgs.
Hassibi et al., "Hoo Optimality Criteria for LMS and Backpropagation," Advances in Neural Information Processing Systems, 1994, vol. 6, pp. 351-358.
He et al., "Deep residual learning for image recognition," in Proceedings of the IEEE Conference on Computer Vision and Pattern Recognition, 2016, pp. 770-778.
Kaban et al., "Learning with Lq<1 vs L1-Norm Regularisation with Exponentially Many Irrelevant Features," ECML PKDD 2008, Part I, LNAI 5211, pp. 580-596, 2008, 17 pgs.
Kivinen et al., "Exponentiated Gradient versus Gradient Descent for Linear Predictors," Information and Computation, Jan. 10, 1997, vol. 132, Issue 1, pp. 1-63, https://doi.org/10.1006/inco.1996.2612.
Krizhevsky, "Learning Multiple Layers of Features from Tiny Images," Apr. 8, 2009, 60 pgs.
Krizhevsky et al., "ImageNet Classification with Deep Convolutional Neural Networks," Advances in Neural Information Processing Systems (NIPS 2012), vol. 25, 2012, pp. 1097-1105.
Lange et al., "Applications of lp-Norms and their Smooth Approximations for Gradient Based Learning Vector Quantization," ESANN 2014 proceedings, European Symposium on Artificial Neural Networks, Computational Intelligence and Machine Learning. Bruges (Belgium), Apr. 23-25, 2014, pp. 271-276.
Lecun et al., "Deep learning," Nature, May 27, 2015, vol. 521, No. 7553, pp. 436-444, doi: 10.1038/nature 14539.
Lecun et al., "Gradient-Based Learning Applied to Document Recognition," Proceedings of the IEEE, Nov. 1998, vol. 86, No. 11, pp. 2278-2324.
Lee et al., "Gradient Descent Only Converges to Minimizers," JMLR: Workshop and Conference Proceedings, 2016, vol. 49, pp. 1246-1257.
Li et al., "Learning Overparameterized Neural Networks via Stochastic Gradient Descent on Structured Data," Advances in Neural Information Processing Systems, 2018, pp. 8157-8166.
Ma et al., "Implicit Regularization in Nonconvex Statistical Estimation: Gradient Descent Converges Linearly for Phase Retrieval, Matrix Completion, and Blind Deconvolution," Foundations of Computational Mathematics, 2020, vol. 20, pp. 451-632, https://doi.org/10.1007/s10208-019-09429-9.
Ma et al., "The Power of Interpolation: Understanding the Effectiveness of SGD in Modern Over-parametrized Learning," Proceedings of the 35th International Conference on Machine Learning, 2018, vol. 80, pp. 3325-3334.
Mnih et al., "Human-level control through deep reinforcement learning," Nature, Feb. 15, 2015, vol. 518, No. 7540, pp. 529-533, doi:10.1038/nature14236.
Neyshabur et al., "Geometry of Optimization and Implicit Regularization in Deep Learning," arXiv:1705.03071v1 [cs.LG] May 8, 2017, 13 pgs.
Neyshabur et al., "Norm-Based Capacity Control in Neural Networks," JMLR: Workshop and Conference Proceedings, 2015, vol. 40, pp. 1-26.
Oymak et al., "Overparameterized Nonlinear Learning: Gradient Descent Takes the Shortest Path?," Proceedings of the 36th International Conference on Machine Learning, 2019, 10 pgs.
Rigollet, "Mathematics of Machine Learning," Lecture Notes, Oct. 21, 2015, 9 pgs.
Shwartz-Ziv et al., "Opening the black box of Deep Neural Networks via Information," arXiv:1703.00810v3 [cs.LG] Apr. 29, 2017, 19 pgs.
Silver et al., "Mastering the game of Go with deep neural networks and tree search," Nature, Jan. 28, 2016, vol. 529, pp. 484-489, doi: 10.1038/nature16961.
Soltanolkotabi et al., "Theoretical insights into the optimization landscape of over-parameterized shallow neural networks," arXiv:1707.04926v2 [cs.LG], Nov. 8, 2018, 57 pgs.
Soudry et al., "The Implicit Bias of Gradient Descent on Separable Data," Journal of Machine Learning Research, 2018, vol. 19, pp. 1-57, arXiv preprint arXiv:1410-10345.
White, "Regularized factor models," Thesis, 2014, 164 pgs.
Wilson et al., "The Marginal Value of Adaptive Gradient Methods in Machine Learning," 31st Conference on Neural Information Processing Systems (NIPS 2017), 2017, pp. 4151-4161.
Wu et al., "Google's Neural Machine Translation System: Bridging the Gap between Human and Machine Translation," arXiv:1609.08144v2 [cs.CL] Oct. 8, 2016, 23 pgs.

(56) References Cited

OTHER PUBLICATIONS

Xu et al., "Accelerated Stochastic Mirror Descent: From Continuous-time Dynamics to Discrete-time Algorithms," Proceedings of the 21st International Conference on Artificial Intelligence and Statistics (AISTATS) 2018, 10 pgs.
Zhang et al., "Bregman Divergence and Mirror Descent," 2015, 8 pgs.
Zhang et al., "Understanding Deep Learning Requires Re-Thinking Generalization," arXiv:1611.03530v2 [cs.LG] Feb. 26, 2017, 15 pgs.
Zhou et al., "Stochastic Mirror Descent in Variationally Coherent Optimization Problems," Advances in Neural Information Processing Systems, 2017, pp. 7043-7052.

* cited by examiner

305

310

315

320

SYSTEMS AND METHODS FOR TRAINING NEURAL NETWORKS

CROSS-REFERENCE TO RELATED APPLICATIONS

The current application claims the benefit of and priority under 35 U.S.C. § 119(e) to U.S. Provisional Patent Application No. 62/931,030 entitled "Deep Learning With Stochastic Mirror Descent and q-Norm Regularization" filed Nov. 5, 2019. The disclosure of U.S. Provisional Patent Application No. 62/931,030 is hereby incorporated by reference in its entirety for all purposes.

STATEMENT OF FEDERAL SUPPORT

This invention was made with government support under Grant No. ECCS1509977 awarded by the National Science Foundation. The government has certain rights in the invention.

FIELD OF THE INVENTION

The present invention generally relates to training neural networks and, more specifically, selecting and using different potential functions for training neural networks.

BACKGROUND

Deep learning refers to using artificial neural networks as computational models for learning representations from data. The way these models are trained is by presenting them with example data points from a training set, and tuning their internal parameters (weights) so that the model's predictions align well with the given (labels of the) data points. However, the most important aspect of this process is to learn representations that are capable of "generalization" to unseen examples, rather than simply memorizing the training dataset. Hence, the performance of a trained model is measured by how well it can predict on a "test set" consisting of unseen data points. Any improvement in the generalization ability of neural networks is highly valuable, especially given the vast number of applications of these models in artificial intelligence, autonomous systems, bioinformatics, and many other areas.

SUMMARY OF THE INVENTION

Systems and methods for training models in accordance with embodiments of the invention are illustrated. One embodiment includes a method for training an overparameterized model. The method includes steps for initializing an overparameterized model and receiving a set of one or more training samples. The method further includes steps for determining losses for the set of training samples based on a loss function by computing a loss component of the loss function and computing a regularizing component of the loss function. Computing the regularizing component includes applying a potential function to weights of the overparameterized model, and updating weights of the model based on the determined losses for the set of training samples.

In still another embodiment, receiving the set of training samples, determining losses, and updating the weights are performed iteratively as part of an optimization process, wherein the loss component and the regularizing component are weighted to drive the optimization process.

In a still further embodiment, the loss component and the regularizing component are weighted to optimize the loss component to 0.

In yet another embodiment, the regularizing component is selected to optimize closeness to the initialized model and the closeness is computed as a Bregman divergence.

In a yet further embodiment, the potential function is a q-norm potential, where $q>2$.

In another additional embodiment, the potential function is a q-norm potential, where $q>=10$ In a further additional embodiment, the potential function is a negative entropy potential.

In another embodiment again, computing the loss component includes computing a constraint-enforcing loss for at least one training sample of the set of training samples based on an auxiliary variable of a set of auxiliary variables, wherein the auxiliary variable is associated with the at least one training sample.

In a further embodiment again, updating the weights includes updating the associated auxiliary variable of the set of auxiliary variables based on a gradient of the constraint-enforcing loss computed for the at least one training sample.

In still yet another embodiment, the set of auxiliary variables includes an auxiliary variable for each training sample of a dataset.

In a still yet further embodiment, at least one auxiliary variable of the set of auxiliary variables is randomly initialized.

In still another additional embodiment, updating the weights of the model is performed in parallel on several processors.

In a still further additional embodiment, the weights of the overparameterized model are initialized to 0.

In another embodiment, at least one of the weights of the overparameterized model is randomly initialized.

In a further embodiment, the initializing the overparameterized model includes training the overparameterized model to have 0 loss component.

In still another embodiment again, the method is for training an overparameterized model using transfer learning, wherein the set of samples is from a first domain and the overparameterized model is pretrained on a second set of training samples from a different second domain.

One embodiment includes a non-transitory machine readable medium containing processor instructions for training an overparameterized model, where execution of the instructions by a processor causes the processor to perform a process that comprises initializing an overparameterized model, receiving a set of one or more training samples, determining losses for the set of training samples based on a loss function by computing a loss component of the loss function, and computing a regularizing component of the loss function, wherein computing the regularizing component includes applying a potential function to weights of the overparameterized model, and updating weights of the model based on the determined losses for the set of training samples.

Additional embodiments and features are set forth in part in the description that follows, and in part will become apparent to those skilled in the art upon examination of the specification or may be learned by the practice of the invention. A further understanding of the nature and advantages of the present invention may be realized by reference to the remaining portions of the specification and the drawings, which forms a part of this disclosure.

BRIEF DESCRIPTION OF THE DRAWINGS

The description and claims will be more fully understood with reference to the following figures and data graphs, which are presented as exemplary embodiments of the invention and should not be construed as a complete recitation of the scope of the invention.

DETAILED DESCRIPTION

Turning now to the drawings, systems and methods in accordance with many embodiments of the invention can utilize potential functions and/or constraint-enforcing losses to train neural networks. Training in accordance with numerous embodiments of the invention can result in models that are capable of generalization from training samples to new unseen samples. By training in a mirrored domain and/or utilizing constraint-enforcing losses, processes in accordance with some embodiments of the invention can train models to achieve various objectives, such as (but not limited to) sparseness and/or generalization.

Deep learning refers to using artificial neural networks as computational models for learning representations from data. The way these models are trained is by presenting them with example data points from a training set, and tuning their internal parameters (weights) so that the model's predictions align well with the given (labels of the) data points. However, the most important aspect of this process is to learn representations that are capable of "generalization" to unseen examples, rather than simply memorizing the training dataset. Hence, the performance of a trained model is measured by how well it can predict on a "test set" consisting of unseen data points. Any improvement in the generalization ability of neural networks is highly valuable, especially given the vast number of applications of these models in artificial intelligence, autonomous systems, bioinformatics, and many other areas.

Figure 1:
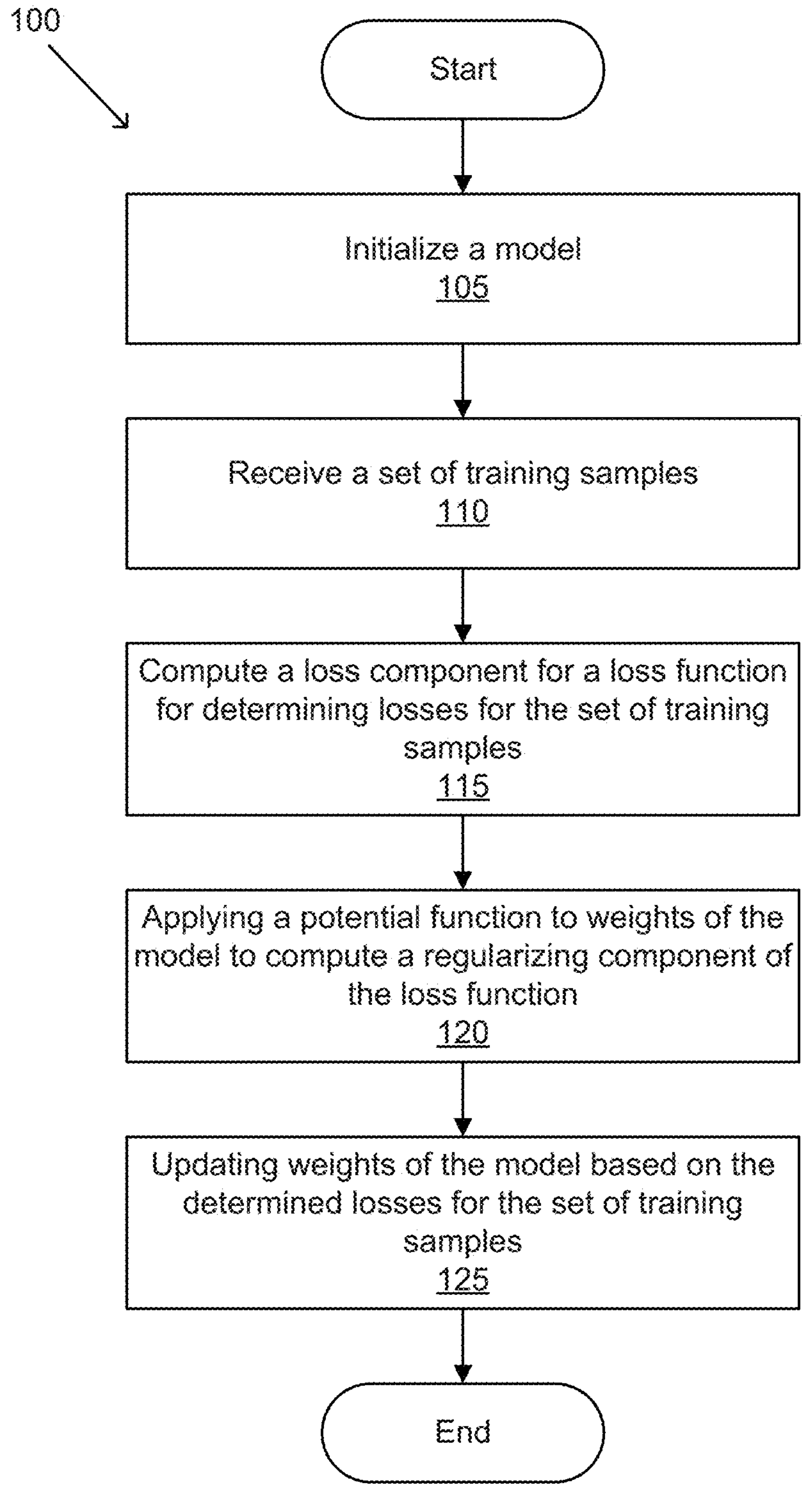
FIG. 1 conceptually illustrates an example of a process for training a model in accordance with an embodiment of the invention.

An example of a process for training a model in accordance with an embodiment of the invention is illustrated in FIG. 1. In a variety of embodiments, processes can be performed in parallel, across multiple processors and/or computers. Process 100 initializes (105) a model. Models in accordance with numerous embodiments of the invention can include (but are not limited to) artificial neural networks, linear models, etc. In several embodiments, initializing a model can include pre-training the model on a first set of data, where the training process can use a different second set of data for transfer learning. Initializing the model in accordance with various embodiments of the invention can include pre-training the model to have loss less than a given threshold (e.g., 0).

Process 100 receives (110) a set of training samples. Training samples in accordance with several embodiments of the invention can include labeled data. In some embodiments, training samples can include various types of data and/or labels, such as (but not limited to) images, video, text, numeric data, etc.

Process 100 computes (115) a loss component for a loss function for determining losses for the set of training samples. The loss component in accordance with a variety of embodiments of the invention can measure the differences between a labeled value for training samples and the predicted values for the samples. In many embodiments, loss components can include a constraint-enforcing loss. Constraint-enforcing losses in accordance with several embodiments of the invention can be used to prevent overfitting of the model to the data. In many embodiments, constraint-enforcing losses can be computed from a set of auxiliary variables, where each sample has an associated auxiliary variable. Auxiliary variables in accordance with many embodiments of the invention can be updated based on a gradient of the constraint-enforcing loss computed for one or more training samples. In several embodiments, auxiliary variables can be initialized to 0 and/or to random values (near zero).

Process 100 applies (120) a potential function to weights of the model to compute a regularizing component of the loss function. Potential functions in accordance with a variety of embodiments of the invention can include various q-norm potentials, where q is a number (e.g., 1, 2, 3, 10, etc.), and/or a negative entropy potential. In certain embodiments, processes can select potential functions to achieve certain objectives (e.g., $\ell_1$ norms to promote sparsity, $\ell_{10}$ norms to promote generalization, etc.). Regularizing components in accordance with certain embodiments of the invention can be selected to optimize closeness to the initialized model, where closeness can be computed as a Bregman divergence.

Process 100 updates (125) weights of the model based on the determined losses for the set of training samples. Although this process is described as a single iteration, one skilled in the art will recognize that similar systems and methods will generally be used as part of an optimization process. In a number of embodiments, optimizations can be performed with weighted values to emphasize the loss or regularizing components of the loss function. Processes in accordance with many embodiments of the invention can weight the loss component for an overparameterized model such that the loss is forced to 0, where the process further optimizes the regularizing component.

While specific processes for training a model are described above, any of a variety of processes can be utilized to train models as appropriate to the requirements of specific applications. In certain embodiments, steps may be executed or performed in any order or sequence not limited to the order and sequence shown and described. In a number of embodiments, some of the above steps may be executed or performed substantially simultaneously where appropriate or in parallel to reduce latency and processing times. In some embodiments, one or more of the above steps may be omitted.

The alignment of a model and a data point i is measured by a (non-negative) "loss function" $L_i(w)$ for any weight vector $w \in \mathbb{R}^p$. For a training set consisting of n data points, the total loss is $$\sum_{i=1}^{n} L_i(w),$$

which is attempted to be minimized. The minimization is typically done using an algorithm called stochastic gradient descent (SGD) (or its variants, such as distributed, mini-batch, adaptive, and momentum). Denoting the model parameters at the t-th time step by $w_t \in \mathbb{R}^p$, and the instantaneous loss function corresponding to the i-th sample by $L_i(\bullet)$, the update rule of SGD is defined as $$w_t = w_{t-1} - \eta \nabla L_i(w_{t-1}),\ t \geq 1, \tag{1}$$

where $\eta$ is a hyper-parameter known as the "step size" or the "learning rate," $w_0$ is the initialization, and $\nabla L_i(\bullet)$ is the gradient of the loss (usually computed using an approach known as "backpropagation"). This procedure is repeated many times until some stopping criterion is met.

Systems and methods in accordance with a number of embodiments of the invention can augment the loss function with a term that promotes closeness to the initial weights $w_0$ and train neural networks by solving the following optimization problem:

$$\min_{w} \lambda \sum_{i=1}^{n} L_i(w) + D_\psi(w, w_0), \tag{2}$$

where $D_\psi(\bullet,\bullet)$ is the Bregman divergence corresponding to a differentiable strictly-convex function $\psi:\mathbb{R}^p \rightarrow \mathbb{R}$, referred to as the "potential function." For example, when $$\psi(w) = \frac{1}{2}\|w\|^2,$$

the Bregman divergence is just the usual Euclidean distance, i.e., $$D_\psi(w, w_0) = \frac{1}{2}\|w - w_0\|^2.$$

Other examples of potential functions in accordance with several embodiments of the invention are discussed in greater detail below.

In certain embodiments, models can be "warm-started" with an initialization $w_0$, e.g., for transfer learning. The parameter $\lambda$ can determine how much weight one wants to give to the loss versus the "regularizer." The bigger $\lambda$ is, the more effort is spent on minimizing the loss. The special case of $\lambda \rightarrow \infty$ will be discussed in a subsequent section.

In scenarios where a particularly good initialization $w_0$ is not known, or where it is desirable to regularize the weights in an absolute sense, one can choose $w_0$ to be the minimizer of $\psi(\bullet)$ (e.g., 0 for $$\psi(w) = \frac{1}{2}\|w\|^2$$

and other norms). In this case, the optimization problem (2) can be reduced to the following special case:

$$\min_{w} \lambda \sum_{i=1}^{n} L_i(w) + \psi(w). \tag{3}$$

Typical deep neural networks can often have a lot of capacity (large number of parameters), which allows them to fit the training data to zero error or $$\sum_{i=1}^{n} L_i(w) \approx 0.$$

However, for various reasons, e.g., when the training data set includes corrupted samples, it may be desirable to avoid fitting the training data all the way to zero error/loss. That is part of the reason why the above formulations are beneficial.

In many embodiments, auxiliary variables can be used to avoid fitting the data to zero error/loss. Defining an auxiliary variable $z \in \mathbb{R}^n$ with elements z(i) for i=1, . . . , n, the optimization problem (2) can be transformed into the following form:

$$\min_{w,z} \lambda \sum_{i=1}^{n} \frac{z^2(i)}{2} + D_\psi(w, w_0) \tag{4}$$
$$\text{s.t. } z(i) = \sqrt{2L_i(w)},\ i = 1, \ldots, n.$$

The objective of this optimization problem is a Bregman divergence, i.e., $$D_\phi\left(\begin{bmatrix} w \\ z \end{bmatrix}, \begin{bmatrix} w_0 \\ \vec{0} \end{bmatrix}\right), \text{ where } \phi\left(\begin{bmatrix} w \\ z \end{bmatrix}\right) = \psi(w) + \frac{\lambda}{2}\|z\|^2.$$

Because the objective is a Bregman divergence, and there are n equality constraints, processes in accordance with a variety of embodiments of the invention can derive a "stochastic mirror descent" (SMD) process for solving it, as described in greater detail below. In many embodiments, in order to enforce the constraints $z(i)=\sqrt{2L_i(w)}$, a "constraint-enforcing" loss can be defined as $\ell(z(i)-\sqrt{2L_i(w)})$, where $\ell(\bullet)$ is a differentiable and convex function with a unique root at 0 (an example is $$\ell(\bullet) = \frac{(\bullet)^2}{2}).$$

At time t, when the i-th training sample is chosen for updating the model, the following update is performed:

$$\nabla_\psi(w_t) = \nabla_\psi(w_{t-1}) + \frac{n\ell'\left(z_{t-1}(i) - \sqrt{2L_i(w_{t-1})}\right)}{\sqrt{2L_i(w_{t-1})}} \nabla L_i(w_{t-1}), \tag{5}$$
$$z_t(i) = z_{t-1}(i) - \frac{n\ell'\left(z_{t-1}(i) - \sqrt{2L_i(w_{t-1})}\right)}{\lambda},$$
$$z_t(j) = z_{t-1}(j),\ \forall\, j \neq i,$$

where $\nabla\psi(\bullet)$ is the gradient of the potential function, and $\ell'(\bullet)$ is the derivative of the constraint-enforcing loss function. The variables can be initialized with $w_0$ and $z_0=\vec{0}$ (or something close to 0). Note that because of strict convexity of the potential function $\psi(\bullet)$, its gradient $\nabla\psi(\bullet)$ is invertible, and the above update rule is well-defined. This iterative process can solve the optimization problem (2) (and the optimization problem (3) if $w_0=0$). If, for example, due to practical considerations, the weights and/or the auxiliary variables cannot be initialized at zero, they can be initialized randomly at some small values without impacting performance.

Processes in accordance with various embodiments of the invention can be used for training neural networks in various settings including, but not limited to: distributed, batch, mini-batch, synchronous, asynchronous, with adaptive learning rate, with momentum, with early stopping, ensemble learning, meta learning, transfer learning, and continual learning.

Special Cases for Different Potential Functions q-Norm Potential

An important special case is when the potential function $\psi(\bullet)$ is chosen to be the $\ell_q$ norm, i.e., $$\psi(w) = \frac{1}{q}\|w\|_q^q = \frac{1}{q}\sum_{k=1}^{p}|w(k)|^q$$

for any positive integer q. Let the current gradient be denoted by $g:=\nabla L_i(w_{t-1})$. In this case, the update rule can be written as:

$$w_t(k) = \left\| w_{t-1}(k)\right|^{q-1} \operatorname{sign}(w_{t-1}(k)) + \frac{\eta\ell'\left(z_{t-1}(i) - \sqrt{2L_i(w_{t-1})}\right)}{\sqrt{2L_i(w_{t-1})}} g(k)\Big|^{\frac{1}{q-1}} \times \operatorname{sign}\left(\left|w_{t-1}(k)\right|^{q-1}\operatorname{sign}(w_{t-1}(k)) + \frac{\eta\ell'\left(z_{t-1}(i) - \sqrt{2L_i(w_{t-1})}\right)}{\sqrt{2L_i(w_{t-1})}} g(k)\right),$$
$$\forall k\ z_t(i) = z_{t-1}(i) - \frac{\eta}{\lambda}\ell'\left(z_{t-1}(i) - \sqrt{2L_i(w_{t-1})}\right),\ z_t(j) = z_{t-1}(j),\ \forall\ j \neq i, \tag{6}$$

where $w_t(k)$ denotes the k-th element of $w_t$ (the weight vector at time t), and g(k) is the k-th element of the current gradient g. Note that this choice of potential function is "separable," in the sense that the update for the k-th element of the weight vector requires only the k-th element of the weight and gradient vectors. This allows for efficient (parallel) implementation of the algorithm, which is of great importance. In certain embodiments, $$\ell(\bullet) = \frac{(\bullet)^2}{2},$$

which implies $\ell'(\bullet)=(\bullet)$ and simplifies the updates:

$$w_t(k) = \left\| w_{t-1}(k)\right|^{q-1} \operatorname{sign}(w_{t-1}(k)) + \frac{\eta\left(z_{t-1}(i) - \sqrt{2L_i(w_{t-1})}\right)}{\sqrt{2L_i(w_{t-1})}} g(k)\Big|^{\frac{1}{q-1}} \times \operatorname{sign}\left(\left|w_{t-1}(k)\right|^{q-1}\operatorname{sign}(w_{t-1}(k)) + \frac{\eta\left(z_{t-1}(i) - \sqrt{2L_i(w_{t-1})}\right)}{\sqrt{2L_i(w_{t-1})}} g(k)\right),$$
$$\forall k\ z_t(i) = z_{t-1}(i) - \frac{\eta}{\lambda}\left(z_{t-1}(i) - \sqrt{2L_i(w_{t-1})}\right),\ z_t(j) = z_{t-1}(j),\ \forall\ j \neq i, \tag{7}$$

In a number of embodiments, processes can use different q for different effects as q-norm regularization can have a different effect on the weights for different q. Some examples follow.

$\ell_1$ norm regularization promotes sparsity in the weights. Sparsity is often desirable for reducing the storage and computational load, since deep neural networks often have millions or billions of weights. However, since $\ell_1$-norm is not differentiable or strictly convex, processes in accordance with many embodiments of the invention can use $$\psi(w) = \frac{1}{1+\epsilon}\|w\|_{1+\epsilon}^{1+\epsilon}$$

for some small $\epsilon>0$. While most sparsification/pruning methods for neural networks are adhoc or done after the training, the proposed method here optimizes for sparsity while training the network.

$\ell_{co}$ norm regularization promotes bounded and small range of weights. With this choice of potential, the weights tend to concentrate around a small interval. This is often desirable in many implementations of neural networks since it can provide a small dynamic range for quantization of weights, which reduces the production cost and computational complexity. However, since $\ell_{co}$ is not differentiable, processes in accordance with some embodiments of the invention can use a large value for q, e.g., q=10 and implement $$\psi(w) = \frac{1}{10}\|w\|_{10}^{10}$$

to achieve the desirable regularization effect of $\ell_{co}$.

$\ell_2$ norm still promotes small weights, similar to $\ell_1$ norm, but to a lesser extent. The update rule is:

$$w_t(k) = w_{t-1}(k) + \frac{\eta\ell'\left(z_{t-1}(i) - \sqrt{2L_i(w_{t-1})}\right)}{\sqrt{2L_i(w_{t-1})}} g(k),\ \forall\ k$$
$$z_t(i) = z_{t-1}(i) - \frac{\eta\ell'\left(z_{t-1}(i) - \sqrt{2L_i(w_{t-1})}\right)}{\lambda},$$
$$z_t(j) = z_{t-1}(j),\ \forall\ j \neq i. \tag{8}$$

This process gives a new dimension to SGD to tolerate possible errors in the labels of training dataset and improve the out-of-sample generalization performance, i.e., classification error. In experiments, two new datasets were created by randomly flipping 10% and 25% of the standard dataset known as CIFAR-10. Using the standard cross-entropy loss, a standard deep neural network was trained with processes in accordance with many embodiments of the invention with $\lambda=0.2$ and $$\ell(\bullet) = \frac{(\bullet)^2}{2}.$$

The out-of-sample test error performance was then compared with SGD. The table below provides the comparison. Processes in accordance with a variety of embodiments of the invention have been shown to improve the test error performance in both cases by a considerable margin with only a negligible increase in computation.

| | Dataset | |
|---|---|---|
| Algorithm | 10% Corruption | 25% Corruption |
| SGD | 12.58% | 20.58% |
| Proposed Method ($\lambda = 0.2$) | 11.82% | 17.19% |

Negative Entropy Potential

In a variety of embodiments, potential functions $\psi(\bullet)$ can include negative entropy, i.e., $$\psi(w) = \sum_{k=1}^{p} w(k)\log(w(k)).$$

For this particular choice, the Bregman divergence reduces to the Kullback-Leibler divergence. Let the current gradient be denoted by g: $=\nabla L_i(w_{t-1})$. The update rule can be written as:

$$w_t(k) = w_{t-1}(k)\exp\left(\frac{\eta\ell'\left(z_{t-1}(i) - \sqrt{2L_i(w_{t-1})}\right)}{\sqrt{2L_i(w_{t-1})}}g(k)\right)\ \forall\ k \tag{9}$$

$$z_t(i) = z_{t-1}(i) - \frac{\eta\ell'\left(z_{t-1}(i) - \sqrt{2L_i(w_{t-1})}\right)}{\lambda},$$

$$z_t(j) = z_{t-1}(j),\ \forall\ j \neq i,$$

This update rule requires the weights to be positive but processes in accordance with some embodiments of the invention can use the magnitude of the weights.

While specific implementations of potential functions have been described above, one skilled in the art will recognize that other alternative potential functions may be utilized as appropriate to the requirements of a given application.

Special Cases: $\lambda \to \infty$

When deep models are highly overparameterized, they have a lot of capacity, and can fit to virtually any (even random) set of data points. In other words, these highly overparameterized models can "interpolate" the training data, so much so that this regime has been called the "interpolating regime". In fact, on a given dataset, the loss function typically can have (infinitely) many global minima, which can have drastically different generalization properties (many of them perform very poorly on the test set). The minimum, among all the possible minima, to which a process converges to in practice can be determined by the initialization and the optimization processes that are used for training the model.

Since the loss functions of deep neural networks are non-convex—sometimes even non-smooth—in theory, one may expect the optimization algorithms to get stuck in local minima or saddle points. In practice, however, such simple stochastic descent algorithms almost always reach zero training error, i.e., a global minimum of the training loss. More remarkably, even in the absence of any explicit regularization, dropout, or early stopping, the global minima obtained by these algorithms seem to generalize quite well (contrary to some other "bad" global minima). It has been also observed that even among different optimization algorithms, i.e., SGD and its variants, there is a discrepancy in the solutions achieved by different algorithms and how they generalize.

Systems and methods in accordance with various embodiments of the invention can train deep neural networks with different members of the family of stochastic mirror descent (SMD) algorithms to lead to different global minima. For any choice of potential function, there is a corresponding mirror descent algorithm. Potential functions in accordance with certain embodiments of the invention can include (but are not limited to) $\ell_1$ norm, $\ell_2$ norm (SGD), $\ell_3$ norm, $\ell_{10}$ norm, and/or negative entropy. In various embodiments, networks can be trained for a sufficiently large number of steps, with a sufficiently small step size, until the network converges to an interpolating solution (global minima).

For overparameterized linear models, SMD can converge to the closest global minimum to the initialization point, where closeness is in terms of the Bregman divergence corresponding to the potential function of the mirror descent. For initialization points around "zero" (i.e. the minimizer of the potential), this means convergence to the minimum-potential interpolating solution, a phenomenon referred to as implicit regularization.

For overparameterized nonlinear models, if the model is sufficiently overparameterized so that a random initialization is w.h.p. (with high probability) close to the manifold of global minima, SMD in accordance with many embodiments of the invention with a (sufficiently small) fixed step size converges to a global minimum that is approximately the closest one in Bregman divergence, thus attaining approximate implicit regularization.

Comparisons between the histograms of these different global minima show that they are vastly different. In particular, the solution obtained by $\ell_1$-SMD is very sparse, and on the contrary, the solution obtained by the $\ell_{10}$ does not have any zero components. More importantly, there is a clear gap in the generalization performance of these algorithms. In fact, the solution obtained by the $\ell_{10}$-SMD, which uses the entire overparameterization in the network, can consistently outperform SGD, which in turn performs better than the SMD with $\ell_1$ norm, i.e. the sparser one.

As mentioned in the formulation section, the bigger $\lambda$ is, the more effort is spent on minimizing the loss. When $\lambda \to \infty$, assuming the model has enough capacity to fit the training data, the problem (2) reduces to the following:

$$\min_{w} D_{\psi}(w, w_0) \tag{10}$$

$$\text{s.t. } \sum_{i=1}^{n} L_i(w) = 0.$$

In other words, this is seeking an "interpolating" (zero-loss) solution, and not just any interpolating solution, rather a special one, i.e., the one that is closest to the initialization $w_0$ in the Bregman divergence sense. A zero-loss solution may be desirable if the training data is clean or if the network is very highly overparameterized.

For the case of $w_0=0$, this further reduces to:

$$\min_{w} \psi(w) \quad \text{s.t.} \sum_{i=1}^{n} L_i(w) = 0. \tag{11}$$

which is the equivalent of (3) for $\lambda \to \infty$ and seeks the minimum-potential interpolating solution.

When $\lambda \to \infty$, the update rule for z in (5) vanishes, and the update becomes:

$$\nabla\psi(w_t) = \nabla\psi(w_{t-1}) + \frac{\eta\ell'\left(-\sqrt{2L_i(w_{t-1})}\right)}{\sqrt{2L_i(w_{t-1})}}\nabla L_i(w_{t-1}). \tag{12}$$

For $$\ell(\bullet) = \frac{(\bullet)^2}{2},$$

the above update rule further reduces to $$\nabla\psi(w_t) = \nabla\psi(w_{t-1}) - \eta\nabla L_i(w_{t-1}). \tag{13}$$

This provides the same customizability as the original algorithm (5), and can be used with different choices of potential and loss functions, including, but not limited to, the ones discussed in the previous section.

q-Norm Potential

Let the current gradient be denoted by g: $=\nabla L_i(w_{t-1})$. If one chooses the potential $\psi(w)$ to be the $\ell_q$-norm, i.e., $$\psi(w) = \frac{1}{q}\|w\|_q^q = \frac{1}{q}\sum_{k=1}^{p}|w(k)|^q,$$

for some positive integer q, the update rule can be written as:

$$w_t(k) = \left\| w_{t-1}(k)\right|^{q-1}\operatorname{sign}(w_{t-1}(k)) - \eta g(k)\Big|^{\frac{1}{q-1}} \operatorname{sign}\left(|w_{t-1}(k)|^{q-1}\operatorname{sign}(w_{t-1}(k)) - \eta g(k)\right), \forall k. \tag{14}$$

Figure 2:
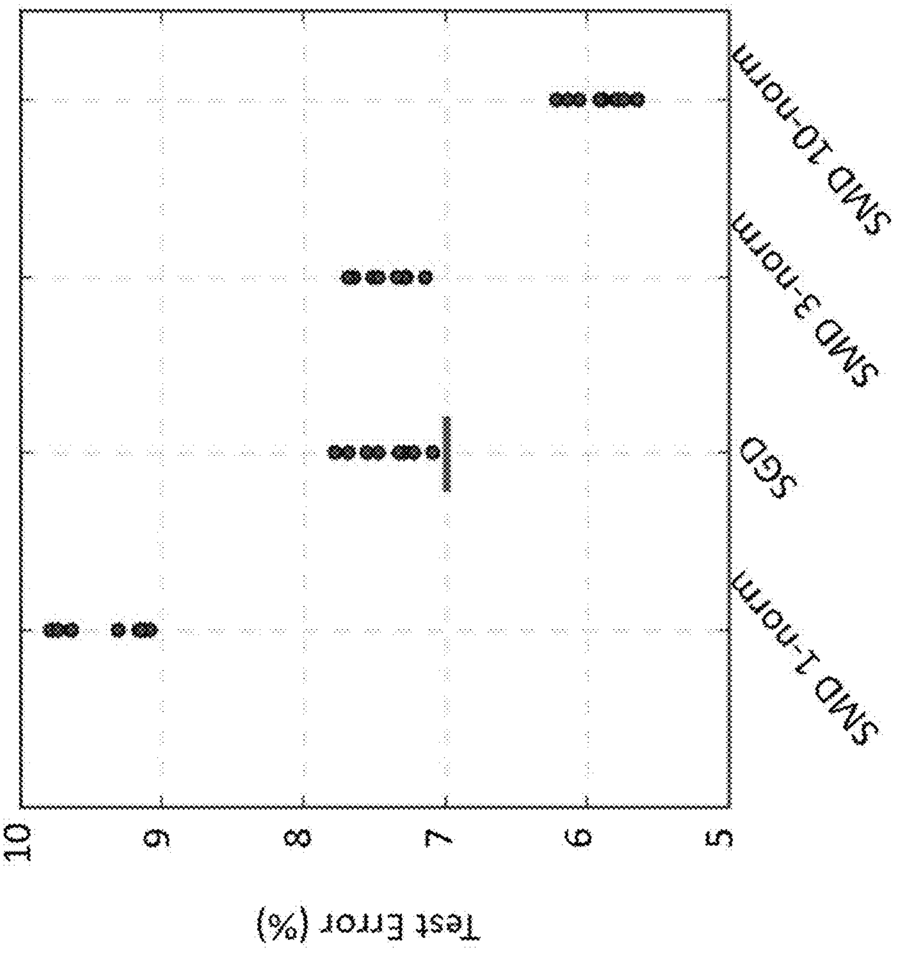
FIG. 2 provides charts that illustrate the test accuracies of different SMD algorithms in accordance with several embodiments of the invention used for training the same deep neural network for a standard data.

Training neural networks with SMD algorithms with a large-norm potential (or regularizing their loss functions with a large-norm) in accordance with a variety of embodiments of the invention can improve generalization significantly. Charts that illustrate the the test accuracies of different SMD algorithms used for training the same deep neural network for a standard data set are illustrated in FIG. 2. As illustrated in this example, large-norm regularization can improve the generalization performance significantly.

Figure 3A:
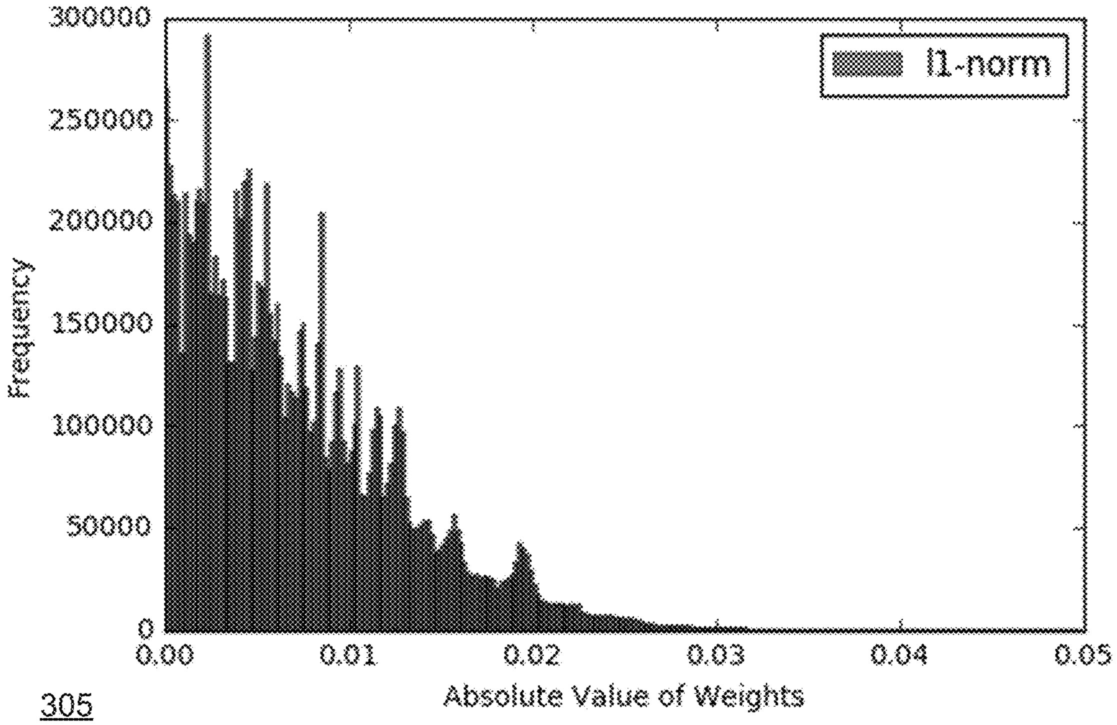
FIGS. 3A-B illustrates histograms of the absolute value of the final weights in the network for different potentials.
Figure 3A:
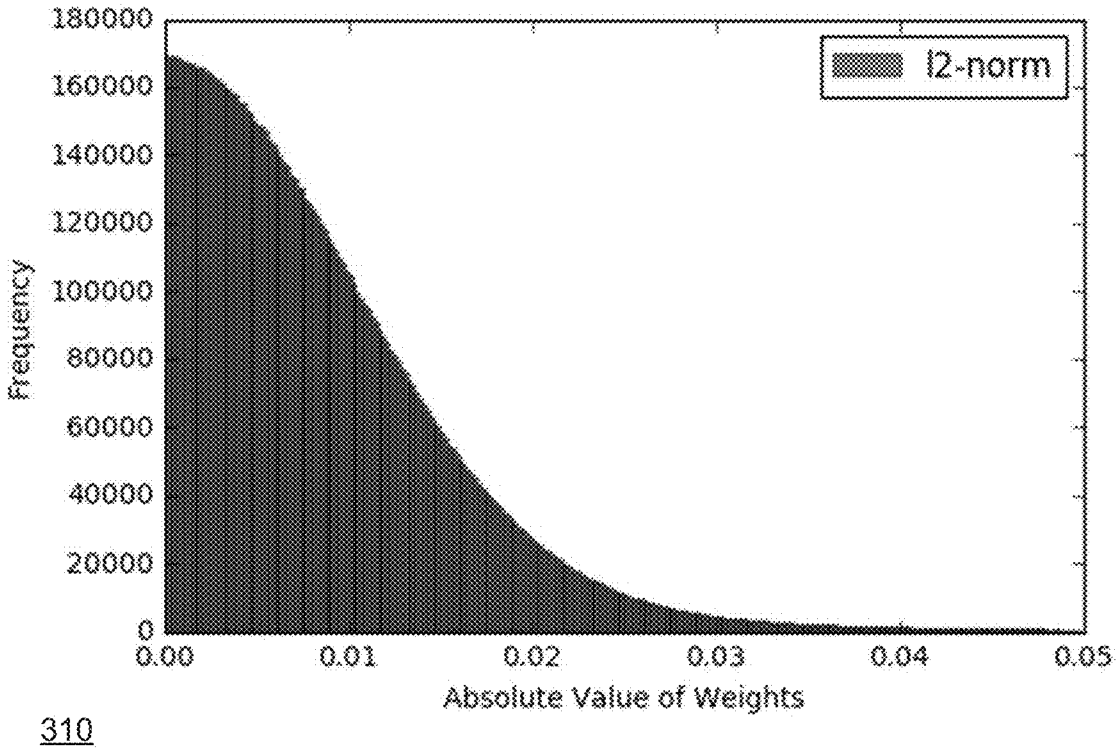
Figure 3B:
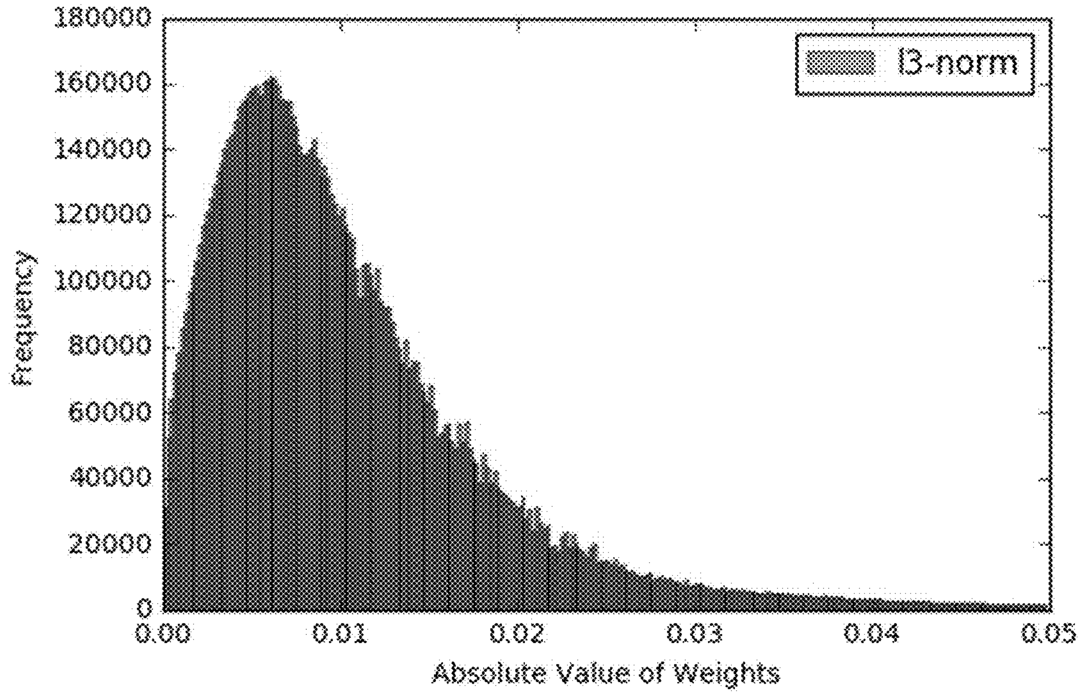
Figure 3B:
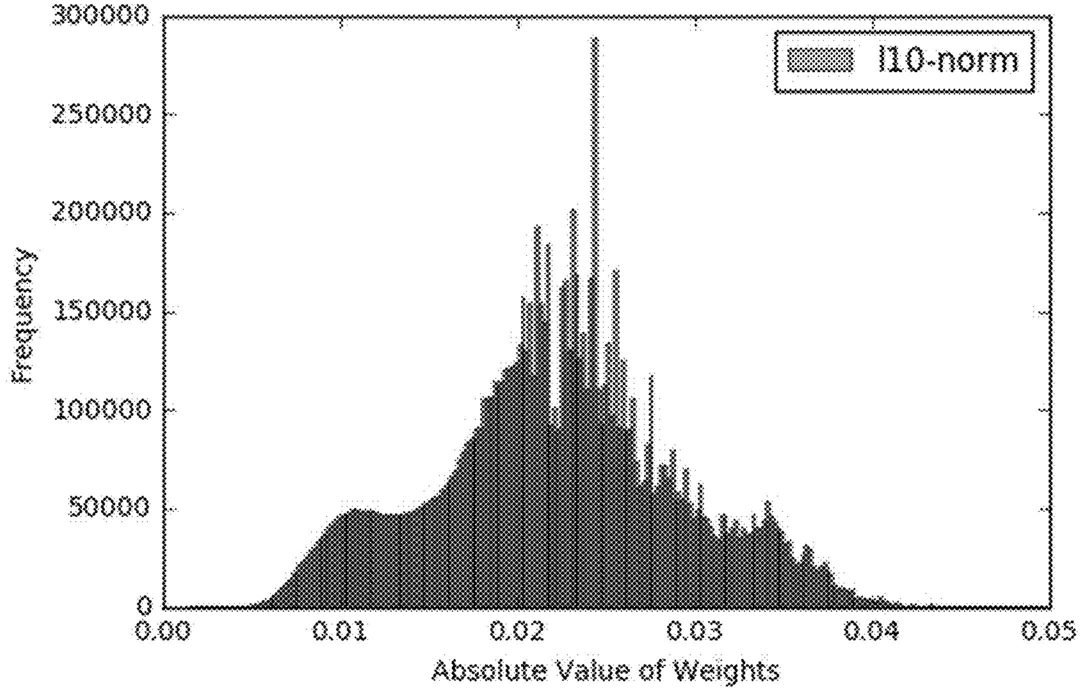

Histograms of the absolute value of the final weights in the network for different potentials are illustrated in FIGS. 3A-B. In this example, the solutions 305-320 obtained by different SMD algorithms are vastly different from one another (and from the one obtained by SGD), even though they all fit the same training data and even though they were initialized with the same set of weight vectors, which highlights the role of the proposed algorithm for training. Each of the four histograms corresponds to an $11\times10^6$-dimensional weight vector that perfectly interpolates the data. The histogram 305 of the $\ell_1$-SMD has more weights at and around zero, i.e., it is very sparse. The histogram 310 of the $\ell_2$-SMD (SGD) looks almost perfectly Gaussian. The histogram 315 corresponding to $\ell_3$ has somewhat shifted to the right, and the $\ell_{10}$ has has completely moved away from zero, i.e., all the weights in the $\ell_{10}$ solution are non-zero. The histogram 320 corresponding to $\ell_{10}$, which uses the entire overparameterization available in the network, generalizes better than the sparser ones.

Model Training

Training System

Figure 4:
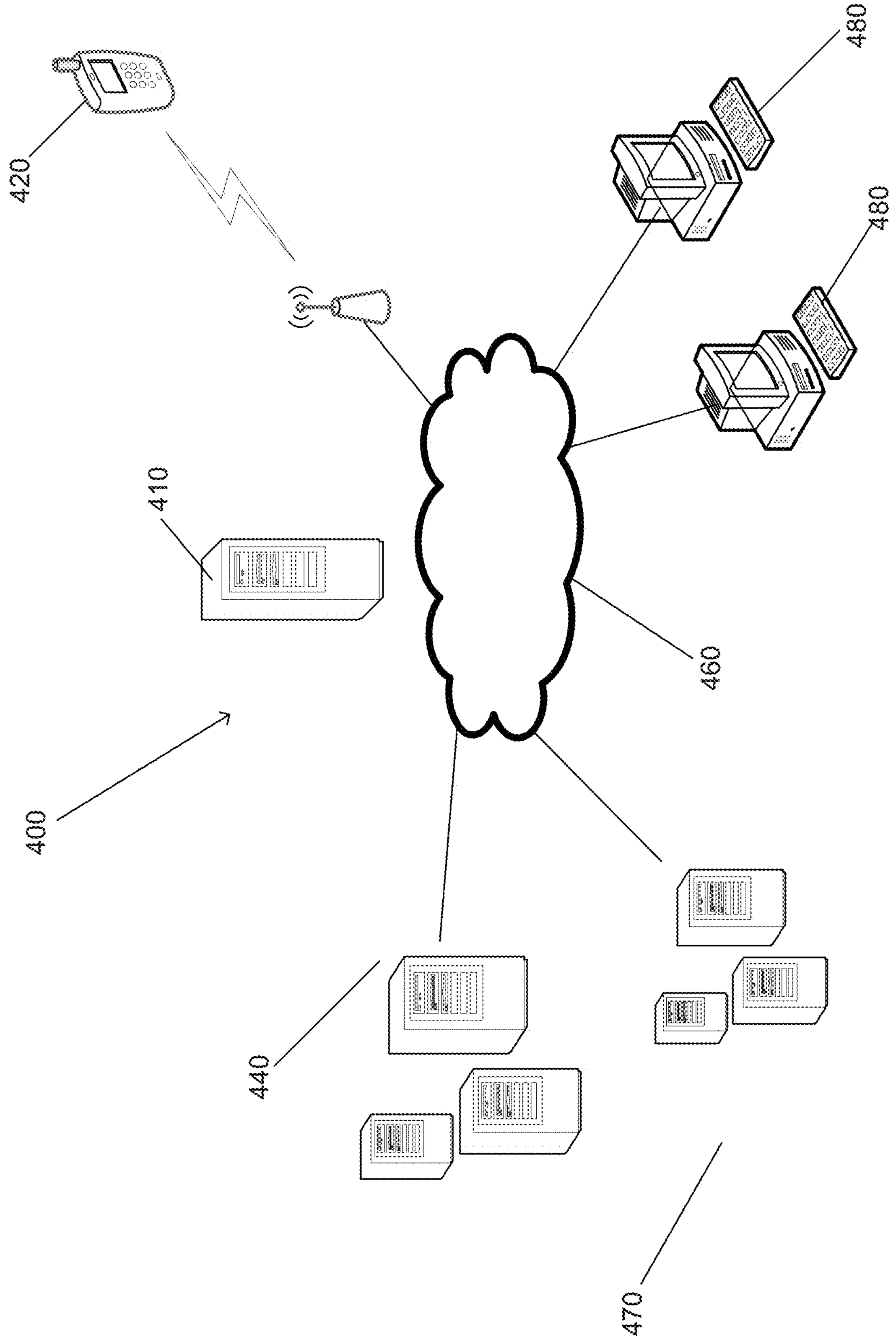
FIG. 4 illustrates an example of a training system that trains models in accordance with an embodiment of the invention.

An example of a training system that trains models in accordance with an embodiment of the invention is illustrated in FIG. 4. Network 400 includes a communications network 460. The communications network 460 is a network such as the Internet that allows devices connected to the network 460 to communicate with other connected devices. Server systems 410, 440, and 470 are connected to the network 460. Each of the server systems 410, 440, and 470 is a group of one or more servers communicatively connected to one another via internal networks that execute processes that provide cloud services to users over the network 460. One skilled in the art will recognize that a training system may exclude certain components and/or include other components that are omitted for brevity without departing from this invention.

For purposes of this discussion, cloud services are one or more applications that are executed by one or more server systems to provide data and/or executable applications to devices over a network. The server systems 410, 440, and 470 are shown each having three servers in the internal network. However, the server systems 410, 440 and 470 may include any number of servers and any additional number of server systems may be connected to the network 460 to provide cloud services. In accordance with various embodiments of this invention, a training system that uses systems and methods that train and/or utilize models in accordance with an embodiment of the invention may be provided by a process being executed on a single server system and/or a group of server systems communicating over network 460.

Users may use personal devices 480 and 420 that connect to the network 460 to perform processes that train and/or utilize models in accordance with various embodiments of the invention. In the shown embodiment, the personal devices 480 are shown as desktop computers that are connected via a conventional "wired" connection to the network 460. However, the personal device 480 may be a desktop computer, a laptop computer, a smart television, an entertainment gaming console, or any other device that connects to the network 460 via a "wired" connection. The mobile device 420 connects to network 460 using a wireless connection. A wireless connection is a connection that uses Radio Frequency (RF) signals, Infrared signals, or any other form of wireless signaling to connect to the network 460. In the example of this figure, the mobile device 420 is a mobile telephone. However, mobile device 420 may be a mobile phone, Personal Digital Assistant (PDA), a tablet, a smartphone, or any other type of device that connects to network 460 via wireless connection without departing from this invention.

As can readily be appreciated the specific computing system used to train models is largely dependent upon the requirements of a given application and should not be considered as limited to any specific computing system(s) implementation.

Training Element

Figure 5:
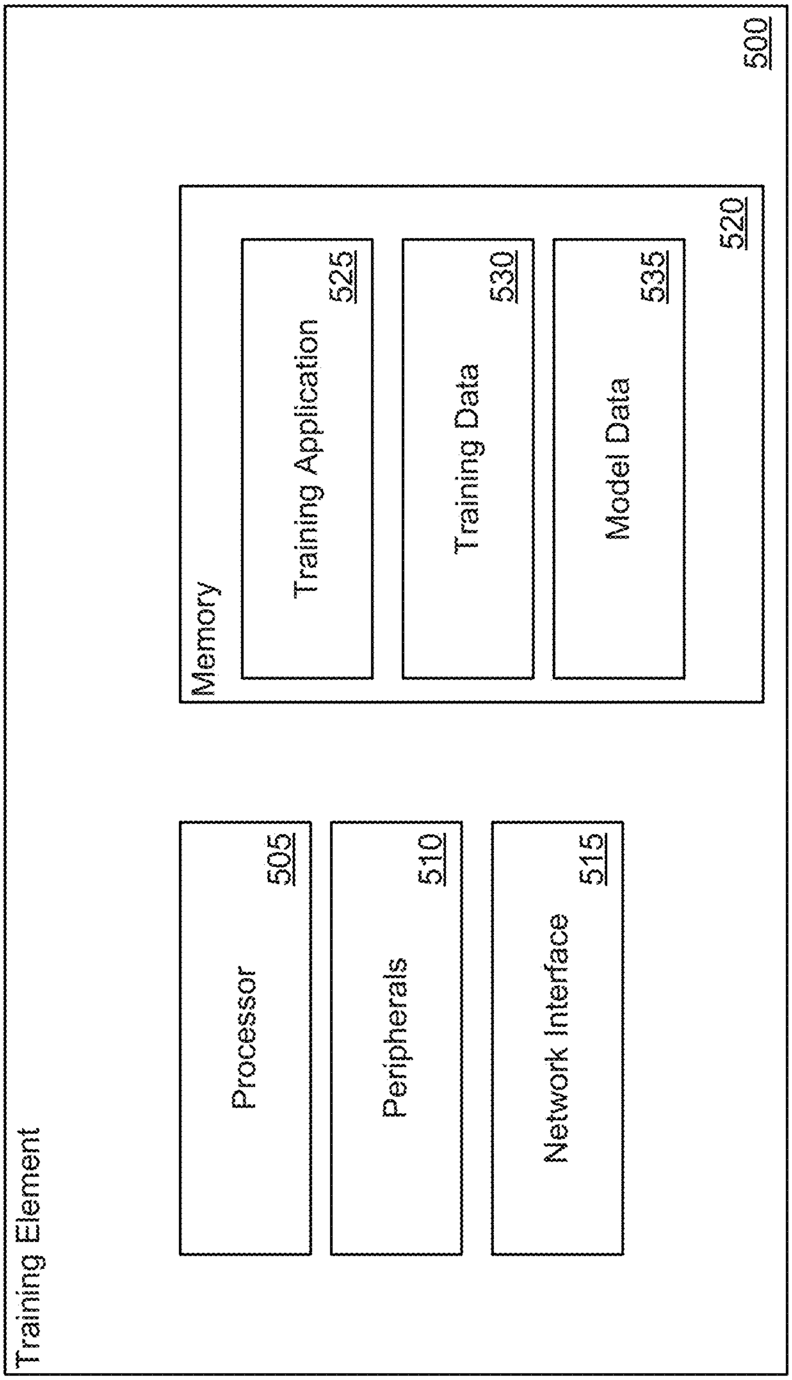
FIG. 5 illustrates an example of a training element that executes instructions to perform processes that train and/or utilize models in accordance with an embodiment of the invention.

An example of a training element that executes instructions to perform processes that train and/or utilize models in accordance with an embodiment of the invention is illustrated in FIG. 5. Training elements in accordance with many embodiments of the invention can include (but are not limited to) one or more of mobile devices, cameras, and/or computers. Training element 500 includes processor 505, peripherals 510, network interface 515, and memory 520. One skilled in the art will recognize that a training element may exclude certain components and/or include other components that are omitted for brevity without departing from this invention.

The processor 505 can include (but is not limited to) a processor, microprocessor, controller, or a combination of processors, microprocessor, and/or controllers that performs instructions stored in the memory 520 to manipulate data stored in the memory. Processor instructions can configure the processor 505 to perform processes in accordance with certain embodiments of the invention.

Peripherals 510 can include any of a variety of components for capturing data, such as (but not limited to) cameras, displays, and/or sensors. In a variety of embodiments, peripherals can be used to gather inputs and/or provide outputs. Training element 500 can utilize network interface 515 to transmit and receive data over a network based upon the instructions performed by processor 505. Peripherals and/or network interfaces in accordance with many embodiments of the invention can be used to gather inputs that can be used to train models.

Memory 520 includes a training application 525, training data 530, and model data 535. Training applications in accordance with several embodiments of the invention can be used to train models using potential functions and/or auxiliary variables.

Training data in accordance with many embodiments of the invention can include various types of training data (or samples), such as (but not limited to) video, audio, text, images, etc. In various embodiments, training data may include labels for the training data. Training data in accordance with some embodiments of the invention can be received continuously, where training applications can update the model continuously as new data is received.

In several embodiments, model data can store various parameters, auxiliary variables, and/or weights for models. Model data in accordance with many embodiments of the invention can be updated through training on training data captured on a training element or can be trained remotely and updated at a training element. In a variety of embodiments, model data can include data for a pre-trained model that can be updated based on a new set of training data.

Although a specific example of a training element 500 is illustrated in this figure, any of a variety of training elements can be utilized to perform processes for training models similar to those described herein as appropriate to the requirements of specific applications in accordance with embodiments of the invention.

Training Application

Figure 6:
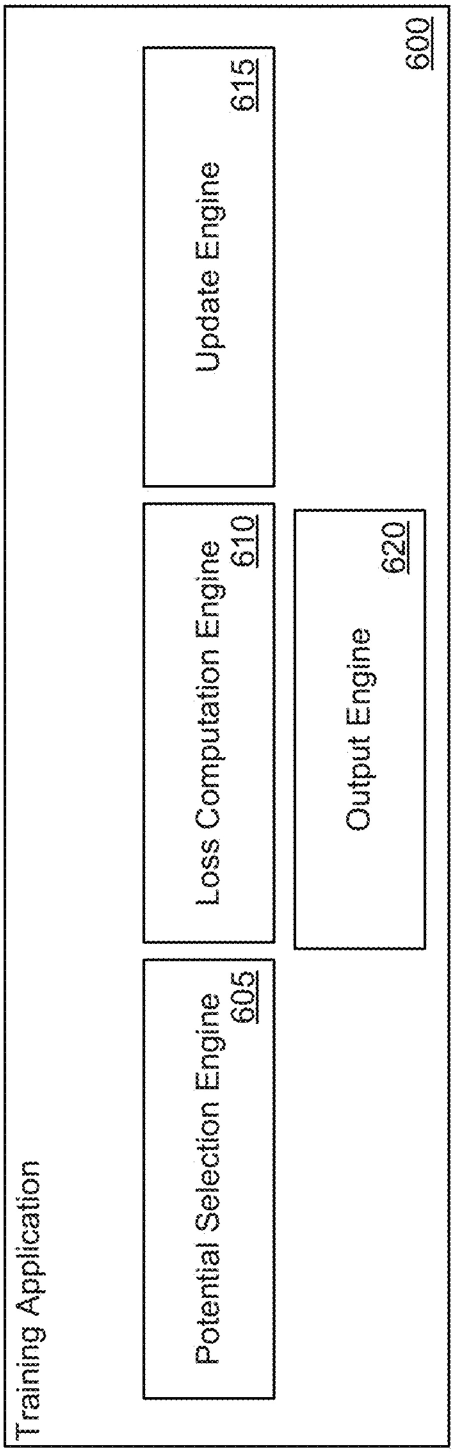
FIG. 6 illustrates an example of a training application for training models in accordance with an embodiment of the invention.

An example of a training application for training models in accordance with an embodiment of the invention is illustrated in FIG. 6. Training application 600 includes potential selection engine 605, loss computation engine 610, update engine 615, and output engine 620. One skilled in the art will recognize that a training application may exclude certain components and/or include other components that are omitted for brevity without departing from this invention.

Potential selection engines in accordance with numerous embodiments of the invention can select a potential function to be used in training a model. In numerous embodiments, potentials can be selected based on desired characteristics of the output model (e.g., generalization, sparsity, etc.).

In a number of embodiments, loss computation engines can compute losses in accordance with various methods described throughout this specification. Loss computation engines in accordance with several embodiments of the invention can compute loss components and regularizing components. In some embodiments, loss components can include a constraint-enforcing loss. Constraint-enforcing losses in accordance with some embodiments of the invention can be computed based on auxiliary variables associated with each element of a training dataset. In a variety of embodiments, auxiliary variables are only used in training of the model and are not part of the output model.

Regularizing components of a loss function in accordance with many embodiments of the invention can be computed by applying a potential function to weights of a model. Potential functions in accordance with a variety of embodiments of the invention can include various q-norm potentials, where q is a number (e.g., 1, 2, 3, 10, etc.), and/or a negative entropy potential. Regularizing components in accordance with certain embodiments of the invention can be selected to optimize closeness to the initialized model, where closeness can be computed as a Bregman divergence.

Update engines in accordance with certain embodiments of the invention can update weights of a model and/or auxiliary variables throughout an optimization process. In a number of embodiments, update engines can update weights based on computed losses as described herein. Update engines in accordance with several embodiments of the invention can update auxiliary variables based on gradients for constraint-enforcing losses.

In a variety of embodiments, output engines can provide a variety of outputs to a user, including (but not limited to) weights and/or outputs for a model. Outputs for a model in accordance with a variety of embodiments of the invention can include (but are not limited to) classifications, regressions, clusters, etc. In certain embodiments, outputs can include computed losses for a subset of a dataset, where another training application can update weights of a model based on losses computed at multiple different processors.

Although a specific example of a training application is illustrated in this figure, any of a variety of training applications can be utilized to perform processes for training models similar to those described herein as appropriate to the requirements of specific applications in accordance with embodiments of the invention.

Although specific methods of training models are discussed above, many different methods of training models can be implemented in accordance with many different embodiments of the invention. It is therefore to be understood that the present invention may be practiced in ways other than specifically described, without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A method for training an overparameterized model, the method comprising:

initializing an overparameterized model, wherein the overparameterized model is a neural network;

receiving a set of one or more training samples;

determining losses for the set of one or more training samples based on a loss function that comprises a loss component and a regularizing component by:

computing the loss component of the loss function, wherein:

the loss component includes a constraint-enforcing loss that prevents overfitting of the overparameterized model to the set of one or more training samples, and computing the loss component comprises computing the constraint-enforcing loss for at least one training sample of the set of one or more training samples based on an auxiliary variable of a set of auxiliary variables; and computing the regularizing component of the loss function, wherein computing the regularizing component comprises applying a potential function to weights of the overparameterized model;

updating the set of auxiliary variables and the weights of the overparameterized model, in parallel, to produce a set of updated regularizing auxiliary variables and updated weights, based on the losses determined for the set of one or more training samples, wherein:

updating the set of auxiliary variables is executed to avoid fitting the set of one or more training samples to zero error;

updating the set of auxiliary variables comprises:

obtaining a gradient of the constraint-enforcing loss computed for the at least one training sample, and updating, based on the gradient, an associated auxiliary variable of the set of auxiliary variables, that is associated with the at least one training sample; and updating the weights is done based on the loss component and the regularizing component; and training the overparameterized model, at least in part, using the set of auxiliary variables and the updated weights.

2. The method of claim 1, wherein:

receiving the set of one or more training samples, determining the losses, and updating the weights are performed iteratively as part of an optimization process; and the loss component and the regularizing component are weighted for at least one of:

driving the optimization process, and optimizing the loss component to 0.

3. The method of claim 1, wherein the regularizing component is selected to optimize closeness to the overparameterized model and the closeness is computed as a Bregman divergence.

4. The method of claim 1, wherein the potential function is selected from the group consisting of:

a first q-norm potential, wherein q>=10;

a second q-norm potential, wherein q=1; and a negative entropy potential.

5. The method of claim 1, wherein the set of auxiliary variables comprises at least one selected from the group consisting of:

an individual auxiliary variable for each training sample of a dataset; and at least one randomly-initialized auxiliary variable.

6. The method of claim 1, wherein the weights of the overparameterized model comprise at least one selected from the group consisting of:

a weight that is initialized to 0; and a randomly-initialized weight.

7. The method of claim 1, wherein the regularizing component is at least one selected from the group consisting of a Bregman divergence, a q-norm potential, and a negative entropy potential.

8. The method of claim 1, wherein initializing the overparameterized model comprises training the overparameterized model to have 0 loss component.

9. The method of claim 1, wherein training the overparameterized model comprises using transfer learning.

10. The method of claim 9, wherein:

the set of one or more training samples is from a first domain; and the overparameterized model is pretrained on a second set of training samples from a different second domain.

11. A non-transitory machine readable medium containing instructions for training an overparameterized model, where execution of the instructions by a plurality of processors causes the plurality of processors to perform a process that comprises:

initializing an overparameterized model, wherein the overparameterized model is a neural network;

receiving a set of one or more training samples;

determining losses for the set of one or more training samples based on a loss function that comprises a loss component and a regularizing component by:

computing the loss component of the loss function, wherein:

the loss component includes a constraint-enforcing loss that prevents overfitting of the overparameterized model to the set of one or more training samples, computing the loss component comprises computing the constraint-enforcing loss for at least one training sample of the set of one or more training samples based on an auxiliary variable of a set of auxiliary variables; and computing the regularizing component of the loss function, wherein computing the regularizing component comprises applying a potential function to weights of the overparameterized model;

updating the set of auxiliary variables and the weights of the overparameterized model, in parallel, to produce a set of updated auxiliary variables and updated weights, based on the losses determined for the set of one or more training samples, wherein:

updating the set of auxiliary variables is executed to avoid fitting the set of one or more training samples to zero error;

updating the set of auxiliary variables comprises:

obtaining a gradient of the constraint-enforcing loss computed for the at least one training sample, and updating, based on the gradient, an associated auxiliary variable of the set of auxiliary variables, that is associated with the at least one training sample; and updating the weights is done based on the loss component and the regularizing component; and training the overparameterized model, at least in part, using the set of updated auxiliary variables and the updated weights.

12. The non-transitory machine readable medium of claim 11, wherein the regularizing component is at least one selected from the group consisting of a Bregman divergence, a q-norm potential, and a negative entropy potential.

13. The non-transitory machine readable medium of claim 11, wherein:

receiving the set of one or more training samples, determining the losses, and updating the weights are performed iteratively as part of an optimization process; and the loss component and the regularizing component are weighted for at least one of:

driving the optimization process, and optimizing the loss component to 0.

14. The non-transitory machine readable medium of claim 11, wherein the regularizing component is selected to optimize closeness to the overparameterized model and the closeness is computed as a Bregman divergence.

15. The non-transitory machine readable medium of claim 11, wherein the potential function is selected from the group consisting of:

a first q-norm potential, wherein q>=10;

a second q-norm potential, wherein q=1; and a negative entropy potential.

16. The non-transitory machine readable medium of claim 11, wherein the set of auxiliary variables comprises at least one selected from the group consisting of:

an individual auxiliary variable for each training sample of a dataset; and at least one randomly-initialized auxiliary variable.

17. The non-transitory machine readable medium of claim 11, wherein updating the weights of the overparameterized model is performed in parallel on the plurality of processors.

18. The non-transitory machine readable medium of claim 11, wherein the weights of the overparameterized model comprise at least one selected from the group consisting of:

a weight that is initialized to 0; and a randomly-initialized weight.

19. The non-transitory machine readable medium of claim 11, wherein initializing the overparameterized model comprises training the overparameterized model to have 0 loss component.

20. The non-transitory machine readable medium of claim 11, wherein training the overparameterized model comprises using transfer learning.

21. The non-transitory machine readable medium of claim 20, wherein:

the set of one or more training samples is from a first domain; and the overparameterized model is pretrained on a second set of training samples from a different second domain.

* * * * *